(12) United States Patent
Foster

(10) Patent No.: US 7,914,934 B2
(45) Date of Patent: Mar. 29, 2011

(54) HYDRO-OXY FUEL GENERATOR

(75) Inventor: Jesse Foster, Alexandria, LA (US)

(73) Assignee: Jesse Foster, Alexandria, LA (US)

( * ) Notice: Subject to any disclaimer, the term of this patent is extended or adjusted under 35 U.S.C. 154(b) by 1123 days.

(21) Appl. No.: 11/091,094

(22) Filed: Mar. 29, 2005

(65) Prior Publication Data

US 2006/0237328 A1    Oct. 26, 2006

Related U.S. Application Data

(60) Provisional application No. 60/583,024, filed on Jun. 28, 2004.

(51) Int. Cl.
*H01M 2/00* (2006.01)

(52) U.S. Cl. .......................... 429/422; 429/515

(58) Field of Classification Search .................. 204/248, 204/176, 174, 321; 422/186.19, 186.18; 250/533, 540; 205/637, 57, 633; 429/422, 429/515
See application file for complete search history.

(56) References Cited

U.S. PATENT DOCUMENTS

| 4,411,756 A * | 10/1983 | Bennett et al. ................. 204/176 |
| 2005/0016840 A1* | 1/2005 | Petillo ............................. 204/248 |

* cited by examiner

*Primary Examiner* — Jennifer Michener
(74) *Attorney, Agent, or Firm* — Michael J. Vallan

(57) ABSTRACT

The Hydro-Oxy Fuel Generator is an electro/chemical system that can convert ions (Hydronium ions and Hydroxide ions to gases (Hydrogen and Oxygen). The system can be easily mounted on vehicles (cars, trucks, buses, trains, etc.) to produce Hydrogen and Oxygen gases, wherein, gases can be used as an alternative fuel source.

The basic objective of this invention is to create a viable source of fuel that reduces the dependency on fossil fuels.

5 Claims, 14 Drawing Sheets

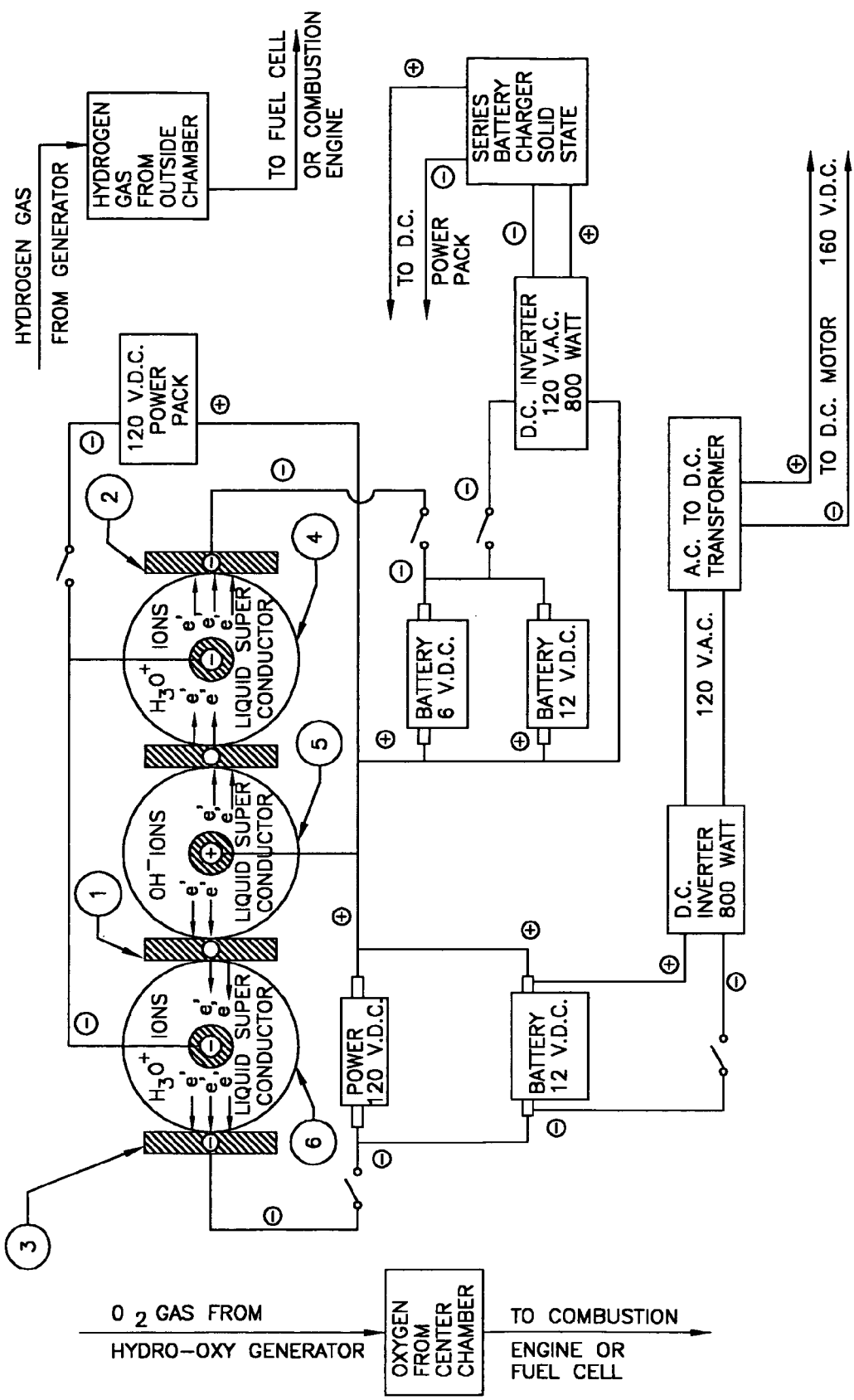
FIGURE # 1

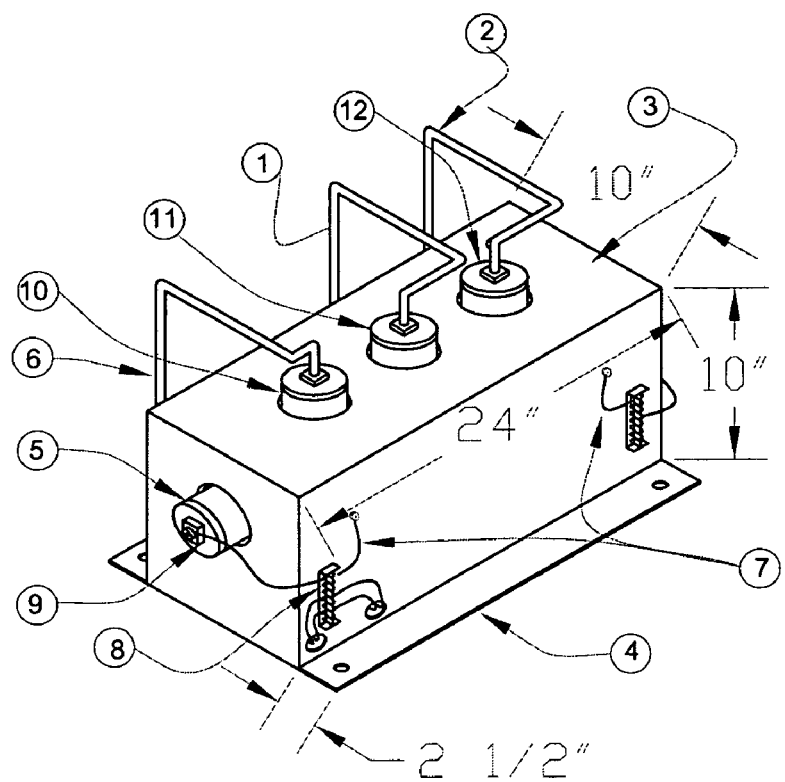
FIGURE #2

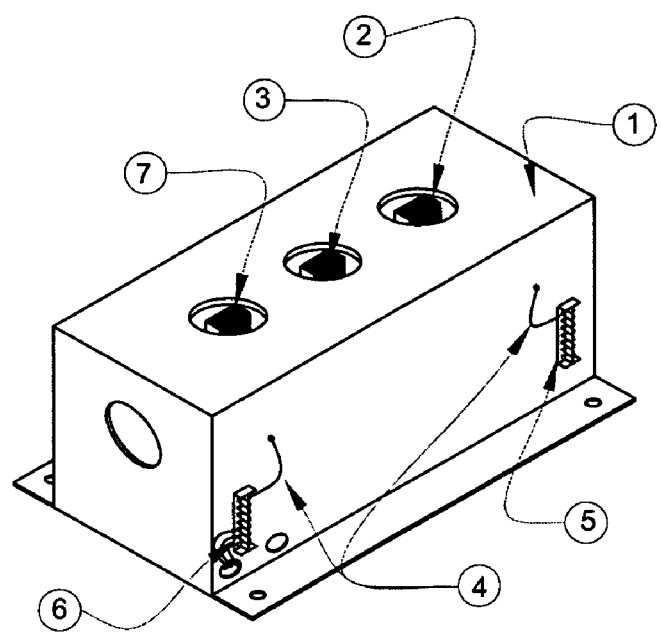
FIGURE #3

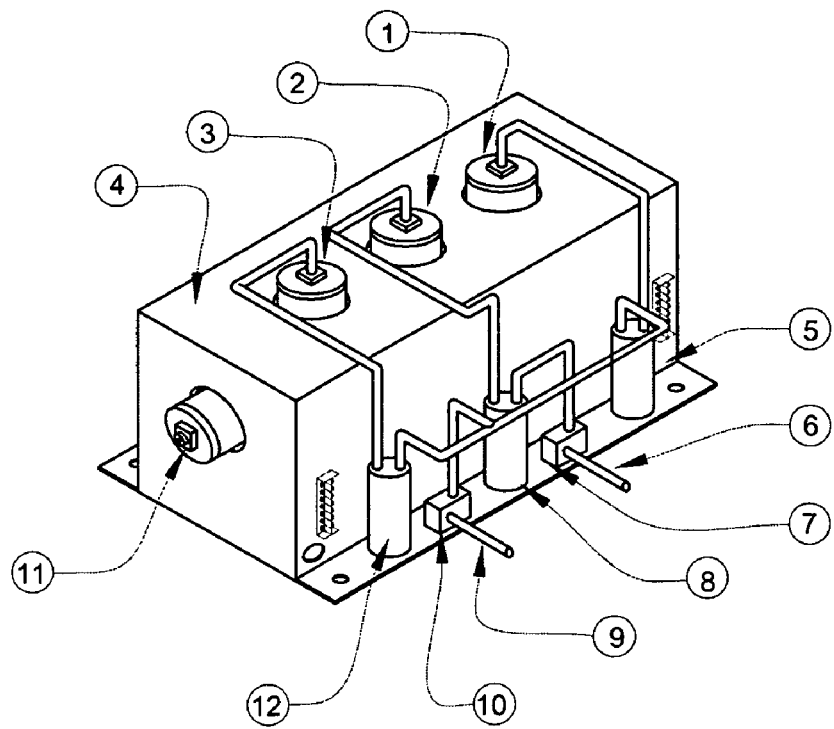
FIGURE #4

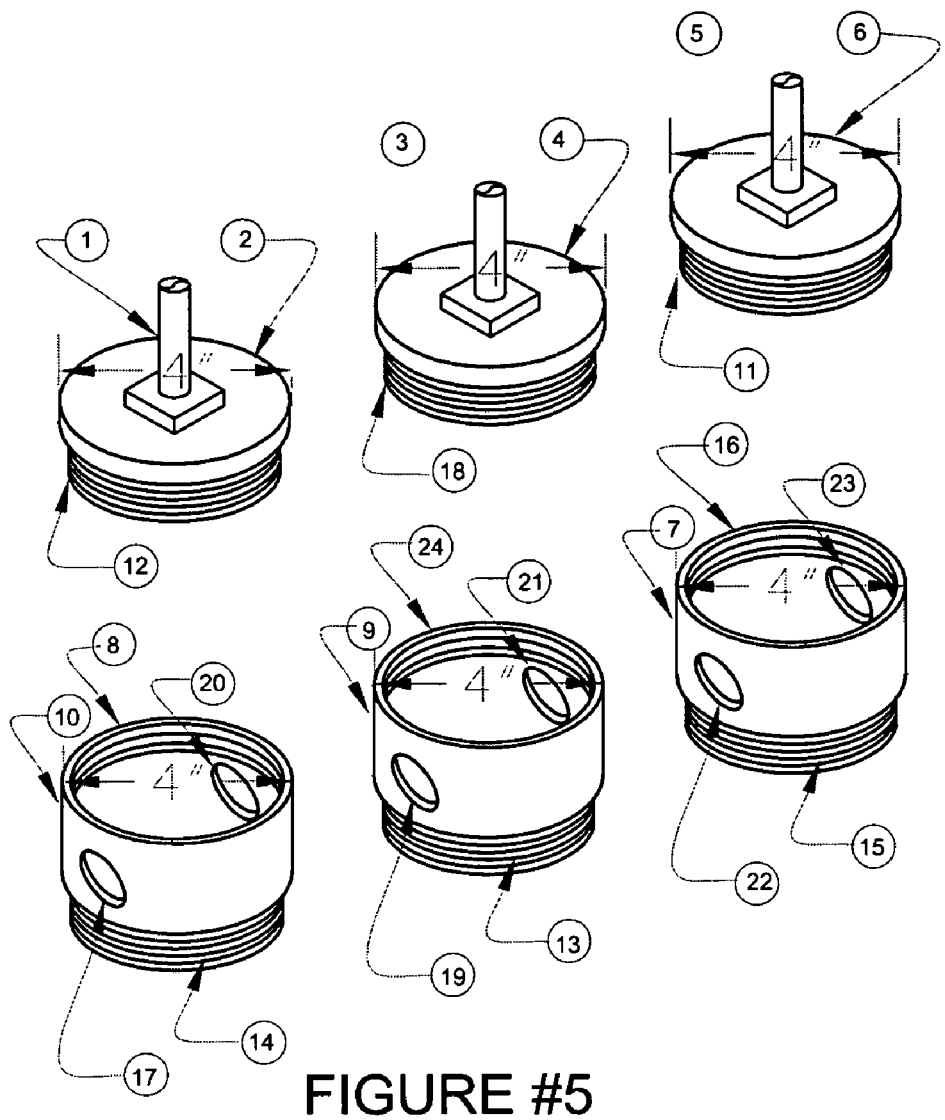
FIGURE #5

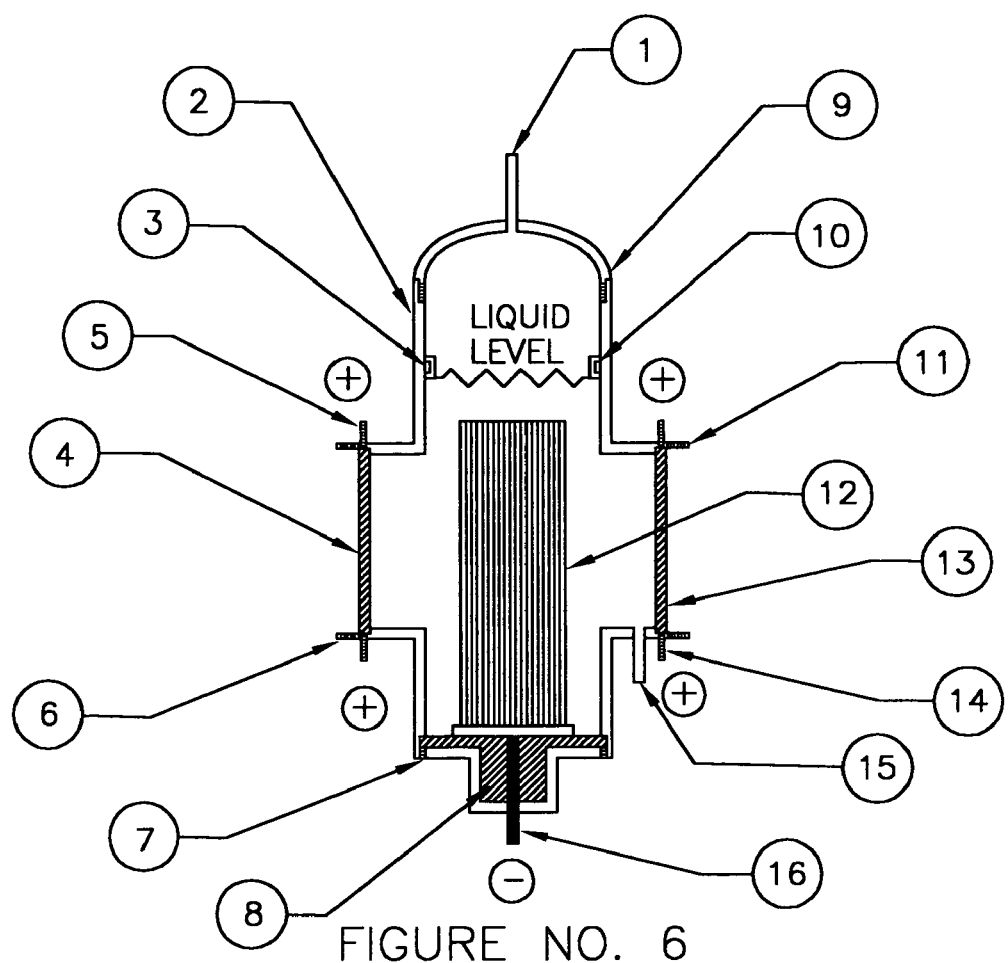
FIGURE NO. 6

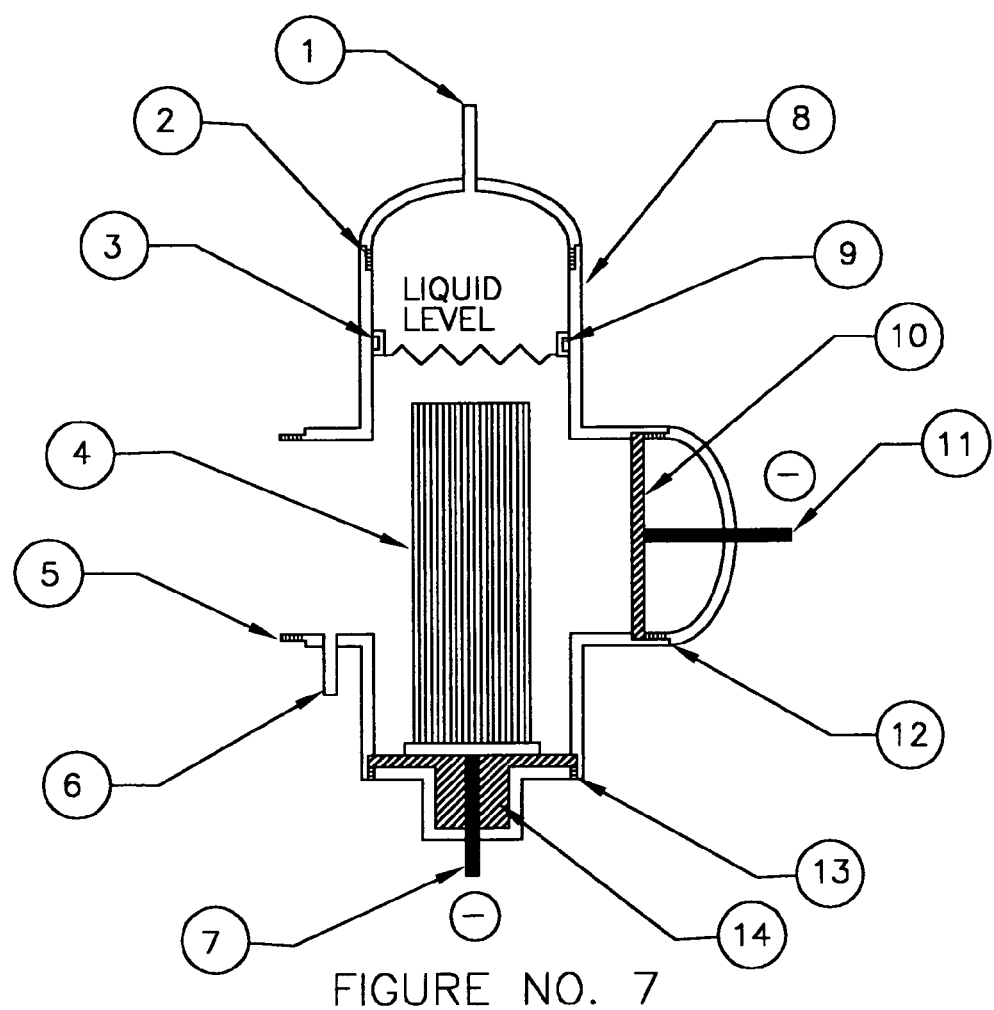
FIGURE NO. 7

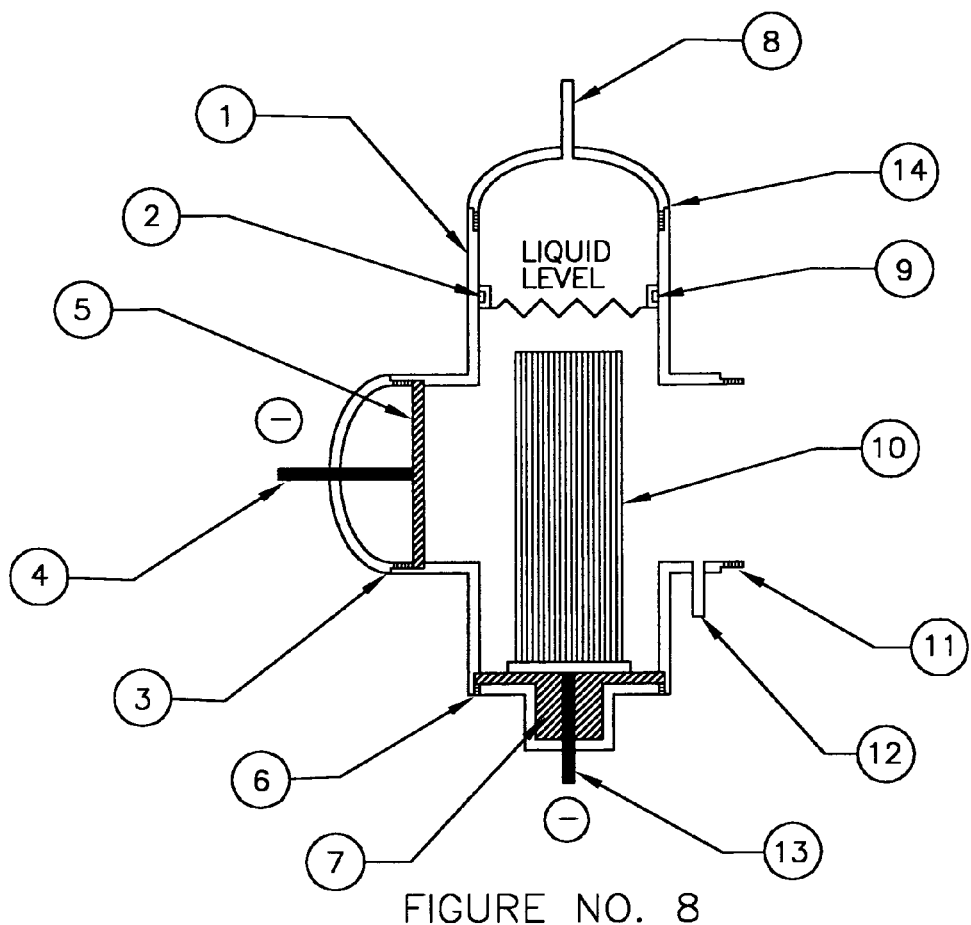
FIGURE NO. 8

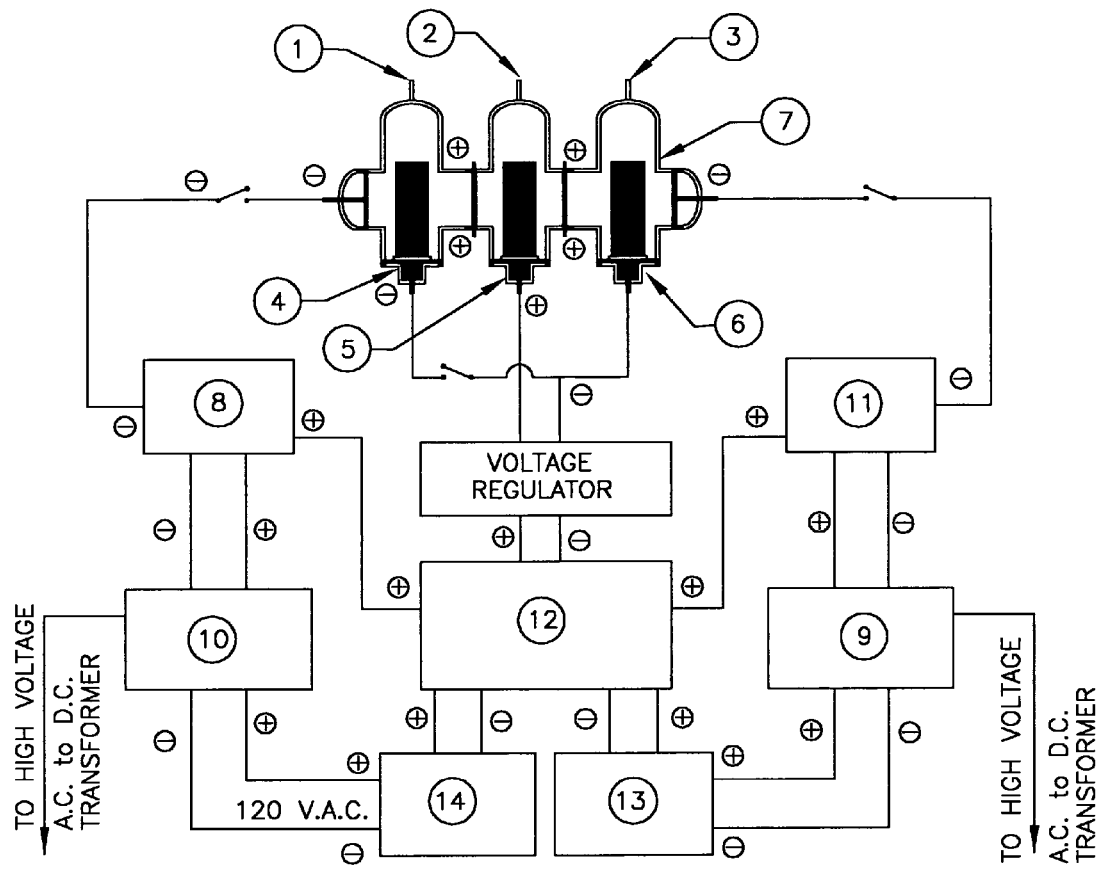
FIGURE # 9

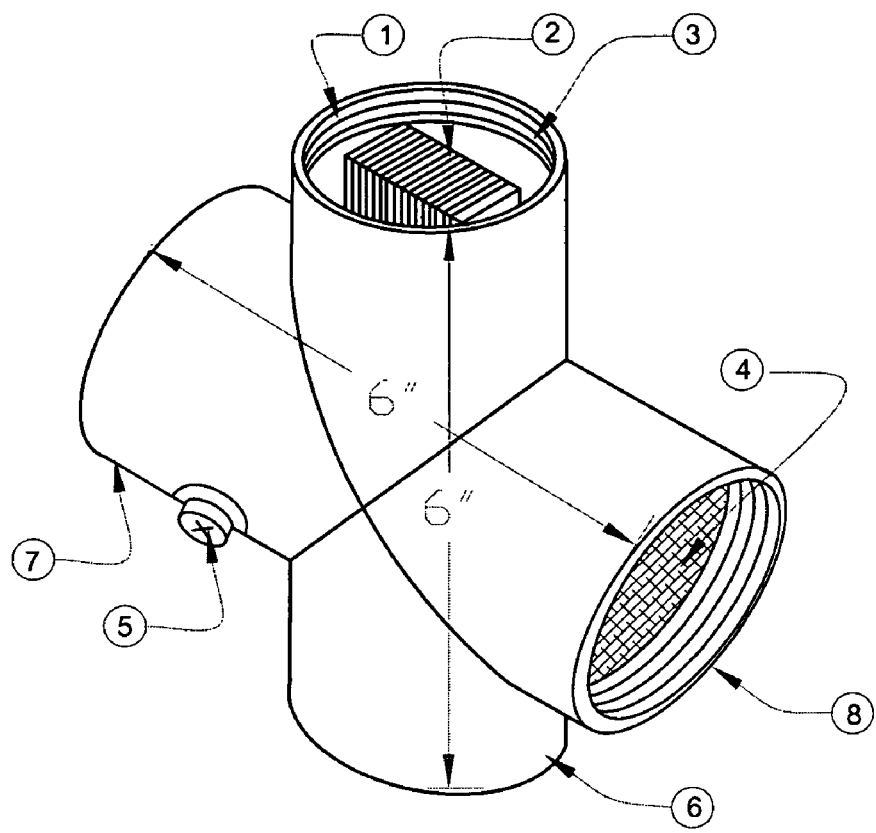
FIGURE #10

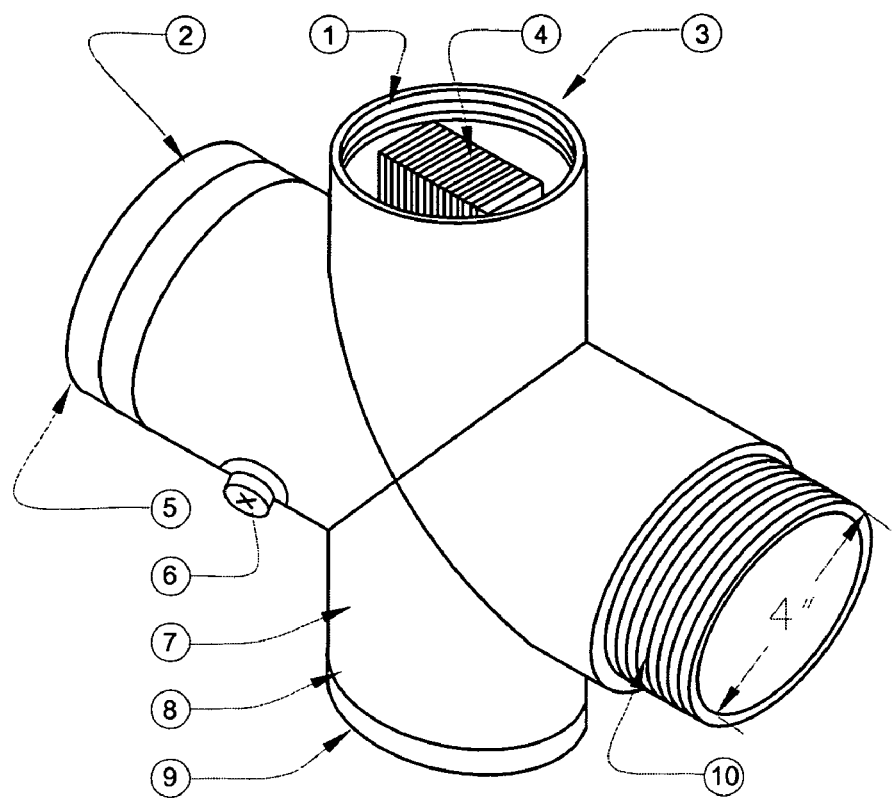
FIGURE #11

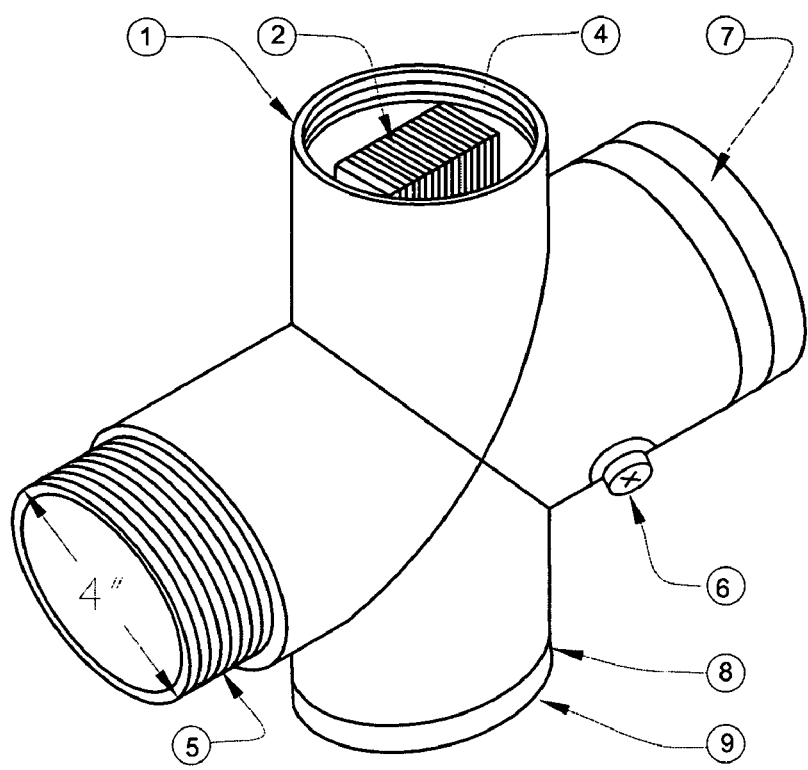
FIGURE #12

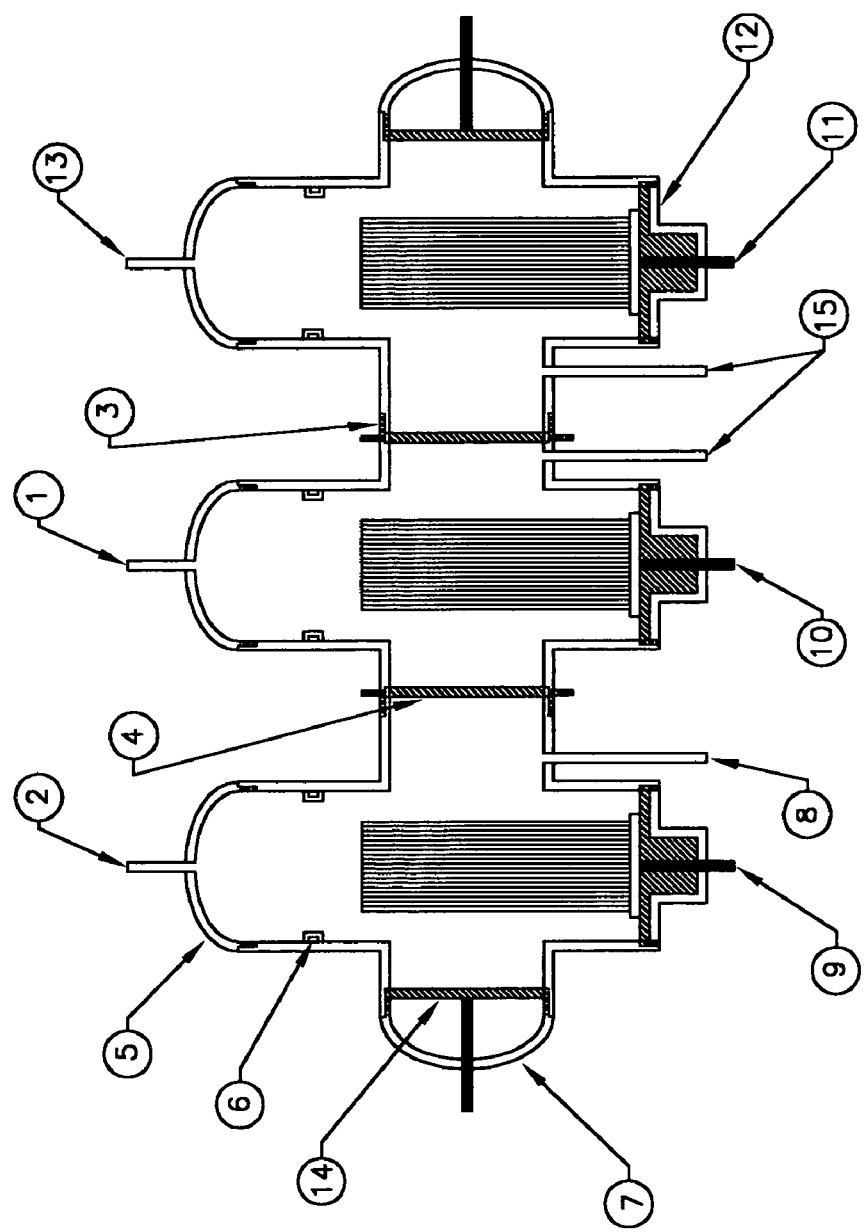
FIGURE NO. 13

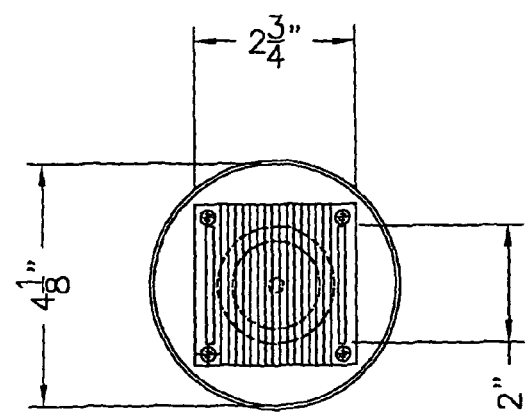
TOP VIEW
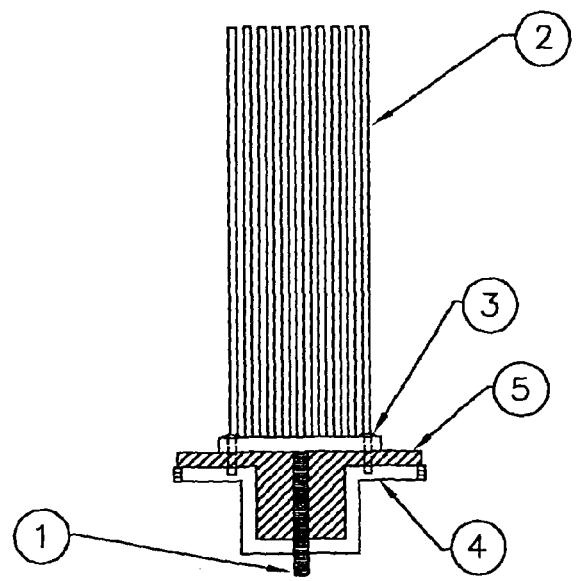
SIDE CROSS SECTION VIEW
FIGURE NO. 14

HYDRO-OXY FUEL GENERATOR

CROSS REFERENCED TO

Provisional Application: No. 60/583,024 filed Jun. 28, 2004

FEDERALLY SPONSORED RESEARCH

None To Date

COMPUTER PROGRAM LISTINGS

None

FIELD OF THE INVENTION

This invention is an Electrical/Chemical System that can convert the Hydronium ion ($H_3O+$) and the Hydroxide ion ($OH-$) to Hydrogen and Oxygen gas. The system can be mounted on vehicles (cars, trucks, buses, trucks, buses, trains, and etc) to generate gases ($H_2$ and $O_2$) that can be used as a fuel source for Hydrogen Fuel Cell, Fossil Fuel Oxidizers, and Hydrogen combustion engines.

BACKGROUND OF THE INVENTION

The utilization of hydrogen fuel cells and hydrogen combustion engines require large volumes of hydrogen gas to be stored on-board vehicles and require new infrastructure which is presently not feasible. Presently, hydrogen fuel cells and hydrogen combustion require large volumes of oxygen to complete combustion. This oxygen is presently being taken from the atmosphere. This causes problems with the environment. THE HYDRO-OXY FUEL GENERATOR produces both hydrogen and oxygen on-board vehicles (as needed). thus, eliminating the need for on-board storage of hydrogen. For every pound of hydrogen generated by the Hydro-Oxy Fuel Generator on-board a vehicle, a large volume of oxygen become available for the combustion process. The production of oxygen on-board vehicles eliminate the need of hydrogen fueled system to remove oxygen from the atmosphere. This process is more environmental friendly.

The Hydro-Oxy Fuel Generator can be used in many situation where electrical energy is required as a power source, such as, in homes, businesses, communications, and transportation. A big selling point of this invention is the compact construction of the system.

SUMMARY OF THE INVENTION

The applicants invention provides an economical means of producing hydrogen and oxygen gas on-board vehicles or other remote places where the gases can be used as an alternative fuel. The Oxygen that the system produces is used to complete hydrogen combustion, thus, eliminating the need of oxygen being taken from the atmosphere. The invention can be readily attached to hydrogen fuel cells and hydrogen combustion engines. The only raw material required for the system is Tap water. The nature of this invention is to make use of the chemical principals involving electrolysis to create an alternative fuel source to reduce the dependency the world has for fossil fuel. However, the main thrust of this invention is to use water to ionize the ion producing salts rather than common salts to ionize water to produce ions in the reaction process. However, water remains the only raw material required to sustain the hydrolysis process.

DESCRIPTION OF DRAWING SECTION

This section consists of a set of drawings labeled from FIG. 1 to FIG. 14. The drawings consist of a Legend and a detailed description for each one. FIG. 1 in the drawing section is only a diagram illustrating the physical arrangement of the Hydro-Oxy Fuel Generator.

Observe that the flow of electrons activated by the D.C. power source is moving from the center chamber (the Anode). This energy (in the form of an electron mass) can migrate through the Graphite Partitions to the Out side Chambers (the Cathode). The Hydronium ions ($H_3O+$) found in abundance in the out side chambers can accept the electrons and liberate Hydrogen Gas. The Hydroxide ions ($OH-$) found in abundance in the center chamber are responsible for releasing the electrons, thus, releasing free Oxygen. In both cases, water result as a by-product and is available for additional ionization. The process is continuous as long as a D.C. current is sustainable and water used in the electrlysis process is replaced.

Description of FIG. 1:

FIG. 1 is a schematic of the Hydro-Oxy Fuel Generator with an example of a power source requirement for activating the Hydronium ions and the Hydroxide ions in the electrolysis of water. The unit that the inventor proposes is using a 120 V.D.C. power pack to activate the electrolytes to increase the ionization energy of water and promote electrolysis of water. The chemical selection for the electrolytes are considered to be super charged with Hydronium ions and Hydroxide ions. The electrolyte used in the center chamber of the unit is rich in Hydroxide ions ($OH-$), and is equipped with a stainless steel electrode connected to the positive terminal of the 120 V.D.C battery pack. The stainless steel electrode release free Oxygen and electrons from the Hydroxide ions ($OH-$). The electrons migrate to the two outside chambers where the unit is rich in Hydronium ions ($H_3O+$). The two outside chambers are equipped with an Aluminum metal electrode in each chamber and they are connected to the negative terminal of the 120 V.D.C. battery pack. The electrodes in the two outside chambers accept the migrating electrons and liberate free Hydrogen gas.

The electrolysis of water is continuous as long as fresh water is added to the chambers to replace the water used in the process. (1) represent ½" thick graphite plates that seals off the two outside chambers from the center chamber to prevent the ($H_3O+$) from coming in direct contact with the ($OH-$) ions, and at the same time, allow electrons to migrate from the center chamber to the two outside chambers to liberate Hydrogen gas from the Hydronium ions ($H_3O+$). (2) and (3) are ¼" thick plates of Aluminum metal that serves as collectors of electrons. The electrons can be used to keep four 12 V.D.C. batteries charged. the four batteries are connected to two 800 watt D.C. To A~C. inverters, one of the D.C. to A.C. inverters is connected to an A.C. to D.C. solid state Transformer to supply D.C. energy to a 25 to 50 hp motor. The other D.C. to A C. inverter is connected to a series battery charger to help recharge the 120 V.D.C. battery pack supply D.C. energy to the Hydro-Oxy Fuel Generator. (4), (5) (6) represents the three chambers that house the electrolytes (super Conductors). The electrodes are mounted in the center of each of the chambers.

Description of FIG. 2:

FIG. 2 is a three dimensional front view of the Hydro-Oxy Fuel Generator. The outside housing (3) for the three adjacent chambers is constructed from 118" thick Aluminum metal sheeting. The dimension of the outside housing is 10" wide, 24" long, and 10'° high. The total volume of the invention is about 1.4 cu. ft. All major parts are visible in the drawing. (1), (2), and (6) piping leading to the scrubbers on the backside of the device which are described in FIG. 4. (5) is a screw-in cap closure on the left side chamber with a terminal post at (9) in the center of the closure. (8) is a terminal post that is attached to the outside housing designed for multiple connection for negative and positive current flow. one side of the terminal (8) is used for the negative current flow and the other side is used for the positive current flow that can come from the graphite partition separating the center chamber from the Outside chambers. (7) is a ground wire connection attached the positive side of the terminal post (8) for whenever a ground wire is needed. (4) is a base plate for mounting the device.

Description of FIG. 3

FIG. 3 is a three dimensional drawing of the Hydro-Oxy Fuel Generator showing the top side. The top caps and barrels have been removed from the three chamber to show the electrode configuration in each chamber. The left side and right side chambers are designed to produce Hydrogen gas.

The center chamber is designed to produce Oxygen gas. (2) and (7) are exposures of the negative electrodes (Cathodes) where Hydrogen is generated. The Cathode electrodes are constructed from aluminum plate metal 11 16" thick, 2.5" wide and 8.0" long. (3) is an exposure of the positive electrode (the Anode) where Oxygen is generated. The Anode is made from 1/16" thick stainless steel that is 2.5" wide and 8.0" long. The shell that house the chambers (1) is constructed from 1/8" thick aluminum plate metal. (4) shows how the shell can be used as a ground when necessary. (6) is a terminal post used to extract a positive current from the graphite partition that seals off the center chamber from the outside chambers. (5) is also a terminal post used to extract negative electrons (−) from the outside chambers. See FIG. 1 for details.

Description of FIG. 4:

FIG. 4 is a three dimensional configuration giving a backside view of the Hydro-Oxy Fuel Generator. (4) is the outside housing for the unit that has a dimension of 10" wide 24" long and 10" high. The shell is constructed from 1/8" Aluminum metal. (1) represents the top side of the left side chamber (facing front view) where Hydrogen gas can exit the chamber. The Hydrogen gas is transported to (5) (a water scrubber) before being pumped by (7) (a mini vacuum pump) to a surge tank. (2) is the top side of the center chamber where Oxygen gas exit the center chamber to (8) (another water scrubber). before being pumped by (10) (a mini vacuum pump) to an Oxygen surge tank. (6) and (9) are tubes leading to the Hydrogen and Oxygen surge tanks. (3) is the top side of the right side chamber (when facing the front view) where additional Hydrogen gas exit the chamber and is transported to (12) (another water scrubber) before being pumped to (10) (a mini vacuum pump) to the surge tank that house the Hydrogen gas. (11) is a terminal post where negative current can be extracted. The backside view of the Hydro-Oxy Fuel Generator show the configuration of the three scrubbers, which are needed to increase the purity of the gases leaving the chamber. Inside the chambers, the gases are exposed to acidic and caustic environments. The water scrubbers are designed to remove the chemical residue from the gases before being transferred to the gas surge tanks.

Description of FIG. 5;

FIG. 5 are drawings showing how the top of each chamber of the Hydro-Oxy Fuel Generator is equipped with a Barrel extension where a level control device can be installed to control the electrolyte level by automatically adding water when the liquid level drop do to the water electrolysis process. (1), (3), and (5) is where the gases are allowed to exit the chambers. (2) and (6) are the Hydrogen gas chamber closures, and (4) is the Oxygen gas chamber closure. The chamber closures are male threaded as shown at (11), (12) and (18) to connect the barrels (7) (9) and (10) (13), (14) and (15) is showing male threaded barrels designed to be connected to the top of each chamber shell. (8), (16) and (20) are female threaded openings (4.0" diameter) for connecting the top closure caps. (17), (19), (20), (21), (22) and (23) are threaded openings for mounting the liquid level controls. All parts in this figure are made Description of FIG. 6:

FIG. 6 is a two dimensional configuration of the center chamber of the Hydro-Oxy Fuel Generator. (1) is a point of outlet for the Oxygen gas. (2) is the shell that is constructed from 1/4" thick epoxy material that is non-conductive, non-corrosive, and can withstand temperatures as low as −40 degrees F. and as high as 240 degrees F. The center is equipped with a low/high liquid level device at (3) and (10) (6) and (11) points out the female threaded openings on both ends of the center chamber where the two outside chambers can be connected to the center chamber. Both ends of the center chamber is sealed with 1/2" thick graphite plates (4) and (13) to prevent the liquid electrolyte in the center chamber from coming in contact with the electrolytes in the two outside chambers. (5) and (14) are terminal post (typical on both sides of the center chamber that can be used to extract positive current (D.C.) from the center chamber. (7) is a threaded bottom opening where the stainless steel electrode is mounted to the chamber shell. (8) is a heat shield material used to prevent the terminal post from over heating. (16) is a terminal post used to connect the positive terminal source of the battery pack to the electrode (the Anode). (12) is a set of stainless steel plates 1116" thick, 2.5'° wide, and 8.0°' long and used anode electrode for liberating Oxygen gas. (15) is a fresh water inlet line which is used to add fresh water to the center chamber.

Description of FIG. 7;

FIG. 7 is a two dimensional configuration showing the right side chamber of the Hydro-Oxy Fuel Generator and its internal electrode (4). Like the center chamber, the right-side chamber is equipped with a liquid level sensor (3) and (9) and screw-in caps for bottom and top servicing. The electrode plates (4) are constructed from 1116°' thick aluminum that measures 2.5" wide and 8.0" long. The metal plate can withstand the acidic environment produce by the chemical electrolyte. (5) is a male threaded opening that is designed to connect to the center chamber (female threaded). (6) is a fresh water line used to add fresh water to replace the water used in the electrolysis process. (7) is a terminal post mounted to the bottom of the electrode for connecting the negative terminal of the 120 v D.C. battery pack. (2) is the male threaded top cap with an outlet for Hydrogen gas at (1) (10) is a 1/4" thick Aluminum plate which is used as an electron collector. The plate is attached to a terminal post (11). (14) is a heat shield material (non-conductor of heat) that is used to control the temperature around the post. (13) is a female threaded opening at the bottom of the chamber that is designed to connect and mount the male threaded closure that is attached to the electrode (4). (8) is the 1/4'° thick epoxy shell that house the electrolyte and electrode. It is non-conductive, non-corrosive, and can withstand temperatures ranging from −40 F. degrees to 240 F. degrees. (12) is the male threaded cap that seals off the end of the chamber.

Description of FIG. 8;

FIG. 8 is a two dimensional cross section showing the left side chamber of the Hydro-Oxy Fuel Generator. (1) is a ¼" thick epoxy shell that is non-corrosive, non-conductive, and can withstand temperatures ranging from −40 degrees F. to 240 degrees F. (8) is an outlet for releasing the Hydrogen gas in the electrolysis process. (2) and (9) is a liquid level control device that automatically let fresh water into the device to maintain the correct level of the electrolyte. (14) is a female threaded opening in the top side of the chamber to connect the top closure to the barrel section that house the liquid level control. (5) is a ¼" thick Aluminum plate sealing off the end of the chamber and serves as an electron collector plate. The Aluminum plate (5) is attached to a terminal post (4)

The terminal post (4) is used to transport the negative current flow from the chamber. (6) is a female threaded bottom opening of the chamber and is designed to connect the bottom closure (7) that is filled with a heat shield material. The electrode (10) is mounted to (7). The electrode (10) is a set of Aluminum plates 1116" thick, 2.5" wide and 8.0" long. The electrode is also mounted to a terminal post (13) that protrudes from the bottom closure. The terminal (13) is designed to be connected to the negative terminal of the 120 V.D.C. power source that the unit requires to activate the ions in the water and electrolyte. (12) is a fresh water inlet line used to replace water that is used in the electrolysis process. (11) is a male threaded opening designed to be connected to the female threaded center. (3) is a cap closure sealing off the end of the chamber. The electrode (10) serves as a Cathode (same as the right side chamber). Both of the electrodes are constructed from aluminum metal which can withstand the acidic environment.

Description of FIG. 9;

FIG. 9 is a schematic of a D.C. power source that shows how D.C. current is inverted to A.C. current and back to D.C. voltage. The schematic also show how electrons (negative current flow) can be drawn from the unit and used to help keep the 120V.D.C. battery pack charged. (1) through (7) are parts of the Hydro-Oxy Fuel Generator that has already been described in FIGS. 6, 7, and 8. (8) is a battery pack (or single 12 v battery) connected to the right side chamber (negative flow) and the negative terminal of the battery (8). The positive side of the battery (8) is connected to (12) the power source for the unit (120 V.D.C. battery back). The battery pack (12) has ten 12 volt batteries connected in batteries. A D.C. to A.C. inverter (10) is also connected to the battery (8). The A.C. energy (120 V.A.C.) can be use to power a D.C. transformer to generate 170 V.D.C. to power a D.C. motor. The D.C. to A.C. inverter (10) can be connected to a solid state battery charger (14). This, battery can be used to transport energy back to the unit power source (12) to help keep the battery pack charged. The power arrangement helps prevent the excessive build-up of heat within the chambers of the Hydro-Oxy Fuel Device. (11), (9), and (13) has the same function as (8), (10), (14). The inverters (9) and (10) has additional A.C. current outlets that can be connected to A.C. to D.C. high voltage transformers to produce 170 volts of D.C. current. This energy can be used to power moderate motors. The gases generated at (1), (2), and (3) can be used to power Fuel Cells, Hydrogen combustion engines, or as Fossil Fuel Oxidizers. The unit has potential for multiple uses.

Description of FIG. 10:

FIG. 10 is a three dimensional view of the center chamber shell of the Hydro-Oxy Fuel Generator. The shell (7) is constructed from ¼" thick epoxy matedal that is non-corrosive, non-conductive, and can withstand a wide temperature range from −40 degrees to 240 degrees F. the drawing shows how the graphite plates (4) are used to seal off the center chamber. The graphite plates (½" thick) are used on both ends of the center chamber to prevent the caustic electrolyte used in the center chamber from coming in contact with the acidic electrolyte in the two adjacent chambers. (5) is a fresh water inlet line used to replace fresh water (automatically) when water is used in the electrolysis process to produce the Hydrogen and Oxygen gas. (3) is a female threaded opening for the barrel connection that house the liquid level control device. 1 is the top of the center chamber opening where the Stainless steel electrode (2) is exposed. The stainless steel electrode (2) is 1116" thick, 2.5" wide, and 8.0" long. The electrode is made from stainless steel to withstand the caustic environment. (6) is the bottom opening.

Description of FIG. 11:

FIG. 11 is a three dimensional configuration of the left side chamber of the Hydro-Oxy Fuel Generator. (1) shows the female threaded opening at the top portion of the chamber (3). (5) is a screw-in cap closure for the end which consist of a terminal post in the center of the cap at (2). (4) shows the arrangement of the metal plates (1116" thick Aluminum) that serve as a cathode electrode where the Hydrogen is liberated. (7) is the ¼" thick epoxy shell that house the electrolyte and the electrode. The shell is non-conductive, non-corrosive, and can withstand temperatures ranging from −40 to 240 degrees F. (6) is a fresh water inlet line for replacing water in the electrolysis process. (8) is a female threaded bottom opening for mounting (9) the male threaded closure that is attached to the electrode. (10) is the male threaded end-part of the chamber shell designed to be connected to the center chamber.

Description of FIG. 12:

FIG. 12 is a three dimensional view of the right side chamber shell of the Hydro-Oxy Fuel Generator. Like the left side, the right side chamber is constructed from an epoxy material that is non-conductive, non-corrosive, and can withstand temperatures ranging from −40 to 240 degrees F. (1) is the female threaded top opening of the chamber showing (2) the electrode arrangement and (4) the female threaded opening for mounting the barrel segment that house the liquid level control device. (3) is a full description of the outer shell that is constructed from ¼ inch epoxy material. The shell dimensions are 6.0" long, 6.0" wide and 4.0" in diameter (a cross configuration). (8) is a screw in closure mounted the electrode. (2) is the electrode which is constructed from 1116" Aluminum plate material that is 2.50" wide and 8.0" long. The bottom closure consist of a terminal post at (9) for attaching the negative terminal of the battery pack (120 V.D.C) power source to the electrode. A terminal post exist at (7) and can be used to extract current from the chamber.

Description of FIG. 13;

FIG. 13 is a two dimensional cross sectional view of the Hydro-Oxy Fuel Generator showing the major parts of the device. (2) and (13) are chamber outlets for the Hydrogen gas generated within the two outside chambers. (1) is the Oxygen outlet that is generated within the center chamber. (5) is a male threaded cap (typical for all three chambers). All the caps (bottom, top, and ends) are all removable for servicing the inside of the chambers. (6) is a liquid level control device (typical on all three of the chambers). The liquid level control device allows water to be added to the chambers when the liquid level drops due to the electrolysis of water. (7) is a male threaded cap (typical on both ends of the unit) with a terminal post extending out of each cap (center) where a negative current flow can be extracted. (14) is an Aluminum plate ¼" thick (typical on both ends of the outside chambers). The Aluminum plate serve as a collector plate for electrons from the outside chambers. (8) and (15) are fresh water inlet lines used for replacing water. (9), (10), (11) are terminal posts for power.

Description of FIG. 14:

FIG. 14 is a two dimensional cross sectional view of the electrode assembly, the three electrodes that are re-required for the unit are the same in size and dimensions, but the cathode electrodes are constructed from aluminum metal and the anode electrode is constructed from stainless steel. The two cathode electrodes (2) are constructed from 1116" Aluminum metal 2.50" wide and 8.0" long. The anode is constructed from stainless steel with the same dimensions and thickness as the Cathode electrodes. The electrode plates are mounted with four 118" screws (3) to a mounting plate (6). The mounting plate for the electrodes is made from the same type of metal used for the electrode plates. The mounting plate (6) in ¼" thick. The electrodes are then mounted to a bottom closure (4). (5) shows the bottom closure filled with a heat shield material that can withstand a high temperature (250 degrees F.). the bottom closure (4) is constructed from ¼" thick epoxy material that can also withstand high and low temperatures (−40 to 240 degrees F.). (1) is a terminal post attached to the electrode plate for a power source connection to the unit battery pack (120 V.D.C.).

A DETAILED DESCRIPTION OF THE INVENTION

This invention requires the molecular conversion of Hydronium ions (H3O+) and Hydroxide ions (OH−) to Hydrogen and Oxygen gases. The conversion of these ions to gases take place when a D.C. current is applied to the electrodes.

The inventor has selected special Double salts to enhance the production of the Hydronium ions {Al2(SO4)3.H2SO4.×H2O} and for the Hydroxide ions {Al(OH)3.NaOH.×H2O}.

PHYSICAL DESCRIPTION OF INVENTION

The Hydro-Oxy Fuel Generator is comprised of three cylindrical chambers constructed from a non-conductive material.

Each chamber can house a special electrolyte solution, and Each chamber consist of a set of metal plates that serves as electrodes. the electrode plates are mounted in the center of each chamber from the bottomside. The electrodes always remains submerged in the electrolyte. The liquid level of the electrolyte in in each chamber is controlled by a liquid level device mounted in each chamber. The surface area of each electrode is about 3 sq. ft.

The three chambers are physically joined together by Male/female threaded ends, but electrolytes are kept separated by graphite partitions on both ends of the center chamber. There is a means of controlling the liquid level in each chamber.

Description of the Electrolytes Used

The inventor has selected special made Double Salts, wherein, one is designed for the two outside chambers which supply Hydronium ions. The salt is made from concentrated Sulfuric Acid and 50% Aluminum Sulfate Hydrate. The product of these chemicals are listed below:

(H2SO4.Al2(SO4)3.18H2O)

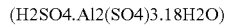

The chemical is added to water to ionize the salt and reach a saturation point. The pH of the electrolyte is less than 0.01 which suggest an enhancement of Hydrinium ions (H3O+).

This electrolyte is used in the two outside chambers of the system which house the Cathode Plates. (negative electrodes).

The electrolyte used in the center chamber (the Anode) is a double salt also. the electrolyte in the center chamber is made by adding Sodium Hydroxide (50% NaOH) or potassium Hydroxide (50% KOH) to aluminum Hydroxide (Al(OH)3. The products of these chemicals are listed below:

Al(OH)3.NaOH.×H2O          a.

Al(OH)3.KOH.×H2O          b.

These chemicals are also mixed with water (to a saturation point) to enhance the concentration of the Hydroxide ions (OH−). One of these electrolytes (a. or b.) is used in the center chamber that house the Anode plates (the positive electrode). The pH of these electrolytes is greater than 14.0 which is an indication that the Hydroxide ions are enhanced.

A Description of the Electrodes:

The three electrodes that make up part of the physical aspect of the invention are mounted in the three chambers. There is a partition to prevent the liquid mass (electrolytes) in the chambers from physically coming in contact with each other. The inventor has selected ½" thick Graphite plates to serve as a partition for the separation of the center chamber from the two outside chambers. Graphite is an electrical conductive material that will allow only the electrons to be transported from one chamber to another.

The outside chambers are equipped with aluminum plates (1/16" in thickness) to serve as negative electrodes. the center chamber is equipped with stainless steel plates (1/16" in thickness) to serve as the positive electrode.

Description of Chamber Housing

The chambers comprising the system is housed in a rectangular shaped structure made from ⅛" aluminum metal. See FIG. 2 in the drawing section for additional details. Housing can serve as a ground.

A Description of the Energy Requirement

This invention requires a D.C. source (30 to 120 V.D.C.) of current as activation energy. The amount of current is proportional to gases liberated from each one of the gas chambers. The two outside chamber which house the cathode electrodes is connected to the negative terminal of a battery pack.

The center chamber which house the anode electrode is connected to the positive terminal of the battery pack. See FIG. 13 for details.

What I claim as my invention is:

1. A hydrogen and oxygen gas generator comprising:
   a. three chambers joined together at adjacent walls, wherein, the two outside chambers contain an electrolyte solution produces hydrogen gas from the hydronium ions present in the solution;
   b. a center chamber containing an electrolyte solution produces oxygen gas from the hydroxide ions present in the solution;
   c. an electrolyte solution containing $Al_2(So_4)_3$* $18H_2O$*$H_2SO_4$ present in the solution and placed in the two outside chambers as a source of additional hydronium ions for the electrolysis process;
   d. an electrolyte solution containing $Al(OH)_3$* $NaOH$*$15H_2O$ present in the solution and placed in the center chamber as a source of additional hydroxide ions for the electrolysis process;
   e. chamber walls constructed from a non-conductive and non-corrosive material, wherein, the adjacent walls of the center chamber is constructed to have a wall in common with the two outside chambers;

f. a center chamber consisting of ½ inch thick graphite windows tightly sealed and mounted in opposite side walls of the center chamber, wherein, allowing the directional flow of a D.C. current to migrate from the center chamber to the two outside chambers;

g. an electrode for each of the two outside chambers constructed from 1/32 inch aluminum or stainless steel metal plates attached to a terminal post rod that extends through the base side of the chamber walls for the purpose of connecting the electrodes to an external D.C. current source;

h. an electrode for the center chamber constructed from 1/32 inch thick stainless steel metal plates attached to a terminal post rod that extends through the base side of the center chamber wall for the purpose of connecting the electrode to an external D.C. current source;

i. a 36 to 60 volt D.C. current source to apply a D.C. current to the electrode present inside the chambers, wherein, the negative terminal of the D.C. current is connected to the two outside chamber electrodes and the positive terminal of the D.C. current is connected to the center chamber electrode.

2. A hydrogen and oxygen gas generator according to claim 1, further comprising:
   a. graphite windows built into opposite side walls of the center chamber, wherein, each window serves as an electric conductive window that allows D.C. current to flow from one chamber to another chamber to complete the electrolytic process, but preventing the electrolyte in the outside chambers from coming in physical contact with the electrolyte in the center chamber;
   b. a means of adjusting current to vary hydrogen and oxygen gas production.

3. A hydrogen and oxygen gas generator according to claim 1, further comprising:
   a. a means of monitoring the temperature inside the three chambers as a safety measure, wherein, system can shut off when there is excessive heat buildup;
   b. a means of adding water by using a level control switch to maintain the solution level in each chamber by adding water;
   c. a water scrubber that allows the gases generated to be bubbled through a water bath to remove impurities from the gases that may affect the usage of the gases.

4. A hydrogen and oxygen gas generator according to claim 1, further comprising:
   a. two small vacuum/pressure pumps, wherein, one pump is used to remove hydrogen from the electrodes in the center chamber by creating a vacuum in the chambers
   b. a ¼ inch thick circular aluminum plates mounted in the outside walls of each outside chamber, wherein, the aluminum plates are attached to a terminal post and can be used to extract electron volts from the electrolytes present in the two outside chambers when an external D.C. current is applied.

5. A hydrogen and oxygen gas generator according to claim 1, further comprising:
   a. a means of controlling D.C. voltage and amperage to vary gas production;
   b. a small surge tank attached to the gas outlet from each chamber to prevent the electrolyte solutions from percolating over in the water solution;
   c. a means of pumping electrolytes from chambers to service the system when needed, wherein, electrolyte in the center chamber is stored separately from electrolyte in the two outside chambers.

* * * * *